US012014887B2

(12) United States Patent
Yajima et al.

(10) Patent No.: US 12,014,887 B2
(45) Date of Patent: Jun. 18, 2024

(54) PUSH SWITCH

(71) Applicant: NIPPON ALEPH CO., LTD., Tokyo (JP)

(72) Inventors: Koichi Yajima, Tokyo (JP); Eiichi Kosuge, Tokyo (JP); Masaya Hagiyama, Tokyo (JP)

(73) Assignee: NIPPON ALEPH CO., LTD., Tokyo (JP)

( * ) Notice: Subject to any disclaimer, the term of this patent is extended or adjusted under 35 U.S.C. 154(b) by 212 days.

(21) Appl. No.: 17/634,045

(22) PCT Filed: Aug. 7, 2020

(86) PCT No.: PCT/JP2020/030506
§ 371 (c)(1),
(2) Date: Feb. 9, 2022

(87) PCT Pub. No.: WO2021/029398
PCT Pub. Date: Feb. 18, 2021

(65) Prior Publication Data

US 2022/0328267 A1 Oct. 13, 2022

(30) Foreign Application Priority Data

Aug. 9, 2019 (JP) ................................ 2019-148078

(51) Int. Cl.
*H01H 36/00* (2006.01)

(52) U.S. Cl.
CPC ...... *H01H 36/004* (2013.01); *H01H 36/0013* (2013.01); *H01H 36/0026* (2013.01); *H01H 36/0033* (2013.01)

(58) Field of Classification Search
CPC .................................... H01H 36/0006–36/004
See application file for complete search history.

(56) References Cited

FOREIGN PATENT DOCUMENTS

| | | |
|---|---|---|
| JP | S6149933 U | 4/1986 |
| JP | H1064360 A | 6/1998 |

(Continued)

OTHER PUBLICATIONS

International Search Report for PCT/JP2020/030506 dated Oct. 20, 2020.

(Continued)

*Primary Examiner* — Ramon M Barrera
(74) *Attorney, Agent, or Firm* — Millen, White, Zelano & Branigan P.C.; William F. Nixon

(57) ABSTRACT

A push switch includes a vertically arranged reed switch, a hollow case disposed to surround the reed switch, an annular first magnet fixedly disposed on the lower side in the case to surround the reed switch and magnetized in the axial direction, an annular second magnet disposed to be axially movable on the upper side in the case to surround the reed switch and magnetized in a direction opposite to the first magnet, and a pushing member mounted to the second magnet to move the second magnet to an operating position close to the first magnet at the time of downward operation. The case is positioned so that in a non-operating state, the pushing member is not pressed down within the case. The contact point of the reed switch comes at the center between the first magnet and the second magnet in the axial direction.

12 Claims, 15 Drawing Sheets

(56) References Cited

FOREIGN PATENT DOCUMENTS

| | | | | |
|---|---|---|---|---|
| JP | H10340656 | A | | 12/1998 |
| JP | 2010181267 | A | * | 8/2010 |
| JP | 2011238352 | A | | 11/2011 |
| WO | 2011158877 | A1 | | 12/2011 |

OTHER PUBLICATIONS

English Abstract of JP2011238352, Publication Date: Nov. 24, 2011.
English Abstract of JPH1064360, Publication Date: Mar. 6, 1998.
English Abstract of WO2011158877, Publication Date: Dec. 22, 2011.
English Abstract JPH10340656, Publication Date: Dec. 22, 1998.

* cited by examiner

PUSH SWITCH

TECHNICAL FIELD

The present invention relates to a push switch that uses a reed switch.

BACKGROUND ART

With a push switch that uses a reed switch, magnetic flux of a permanent magnet is applied to a pair of reeds of the reed switch to magnetize them, making them contact each other by magnetic attraction force to turn on the switch, and making the permanent magnet get away or forming a magnetic path with an auxiliary magnetic body and thus allowing the contact point of the reeds to get away from each other to turn off the switch. ON-OFF switching is performed by allowing the permanent magnet to get away from or come close to the reed switch from outside, or as in the case of a microswitch mechanism disclosed in Patent Literature 1, by allowing a permanent magnet to get away from or come close to the reed switch by the restoring force of an elastic member such as a spring.

CITATION LIST

Patent Literature

Patent Literature 1: JP 61-49933 U1

SUMMARY OF INVENTION

Problem to be Solved by the Invention

However, in the ON state of the push switch using a known reed switch, one reed only is magnetized by the permanent magnet, whereas the other reed is not magnetized by the permanent magnet, which is why the ON state cannot be maintained stably. In addition, the OFF state is generated as a result of the reeds losing magnetism. Known push switches thus become instable due to the effect of external magnetic fields, vibration, etc., and so their reliability as a push switch is low.

The above-mentioned push switch that uses a reed switch also requires an elastic member to return the permanent magnet having been operated to the original position and parts for supporting this elastic member, etc., and so the elastic member is required to have sufficient mechanical durability.

In view of such circumstances, the present invention intends to provide a push switch having a reed switch that is in a simple structure yet has high reliability and durability.

Means for Solving the Problem

To achieve the above objective, a push switch of the present invention comprising:

a reed switch arranged so that its central axis extends in a vertical direction;

a base for housing the reed switch;

a hollow case that is supported by the base and surrounds the reed switch around its central axis;

an annular first magnet fixedly disposed on the lower side in the case in the axial direction so as to surround the reed switch around its central axis and magnetized in the axial direction, an annular second magnet disposed on the upper side of the case in the axial direction to be axially movable so as to surround the reed switch around its central axis and magnetized in a direction opposite to the first magnet and magnetized in a direction opposite to the first magnet; and a pushing member mounted to the second magnet, a part of the pushing member protruding upward from the top edge of the case in the axial direction in a non-operating state where the first magnet is apart from the second magnet by a specified distance by repulsive force between the first magnet and the second magnet, for moving the second magnet to an operating position close to the first magnet at the time of downward operation, wherein in the non-operating state, the case is positioned with respect to the reed switch so that the contact point of the reed switch comes between the first magnet and the second magnet in the axial direction of the case.

Preferably, the case is positioned with respect to the reed switch so that the contact point of the reed witch comes at the center between the first magnet and the second magnet in the non-operating state (see FIG. 5). In a state where the pushing member is not pressed down, the second magnet is in the non-operating state, with the same pole of the two magnets facing each other, and so the two reeds of the reed switch are magnetized to become the same pole respectively by the magnetic field of the corresponding magnet. Since the both reeds of the reed switch act repulsively and come apart from each other, the reed switch is turned off. At that time, since the both reeds of the reed switch are magnetized by their corresponding magnets, allowing them to act repulsively, the OFF state is maintained stably and unsusceptible to external impact such as magnetic fields and vibration.

Meanwhile, when the pushing member is pressed down, the second magnet moves to an operating position close to the first magnet, coming near the contact point of the reed switch. As the result, the lower reed of the reed switch maintains the state magnetized by the first magnet, whereas the upper reed is magnetized to the opposite pole by the second magnet, both reeds being attracted to each other and thus turning on the reed switch (see FIG. 6). Since the both reeds of the reed switch are magnetized and attracted to each other by the magnetic effect of corresponding magnets, the ON state is maintained stably and unsusceptible to external impact such as magnetic fields and vibration. This push switch operates as a normally-open type push switch. This normally-open type push switch is also called “a-contact.” With the normally-open type push switch, once the pushing member is released, the second magnet and the pushing member move upward due to magnetic repulsive force between the first magnet and the second magnet, and return to the non-operating state. In other words, there is no need to provide an elastic member, etc. for returning the second magnet and the pushing member to the non-operating state.

In the above configuration, it is also possible to place the case with respect to the reed switch so that the position near the contact point of the reed switch comes close to the center between the first magnet and the second magnet in the axial direction in the operating state (see FIG. 9). In a state where the pushing member is not pressed down (FIG. 8), the second magnet is in the non-operating state, with the same pole of the two magnets facing and separating from each other, and at the same time the second magnet is away from the contact point of the reed switch. Consequently, the reed switch receives only the magnetic force of the first magnet, which is close to the contact point, the upper reed of the reed switch near the contact point is magnetized to the pole opposite to that of the lower reed, and thus the two reeds contact each other, turning on the switch, due to the magnetic attraction force (see FIG. 8). Since the both reeds of the reed switch contact each other by being magnetized by the magnetic effect of respective magnets, the ON state is maintained stably and unsusceptible to external impact such as magnetic fields and vibration. This push switch is thus operated as a normally-closed type push switch called "b-contact."

With the normally-closed type push switch, once the pushing member is manually pressed down, the second magnet moves to the operating position close to the first magnet, namely close to the contact point of the reed switch. Accordingly, the pole of the upper reed near the contact point reverses to the same pole as the lower reed. Since the reeds are thus separated from each other due to magnetic repulsive force, the reed switch is turned off (see FIG. 9). Since the both reeds are separated from each other by the magnetic effect of respective magnets, the OFF state is maintained stably and unsusceptible to the external impact such as magnetic fields and vibration.

In this case, the pushing member is released, the second magnet and the pushing member move upward due to magnetic repulsive force between the first magnet and the second magnet, returning to the non-operating state. Therefore, an elastic material for returning the second magnet and the pushing member to the non-operating state is unnecessary.

With the present invention, the contact point of the reed switch preferably comes either at a first position, where the contact point is near the center between the first magnet and the second magnet in the non-operating state, or at a second position, where the contact point is near the center between the first magnet and the second magnet in the operating state (shown in FIGS. 3 to 6). In this embodiment, the base has two cutouts that have different heights and are arranged alternately at equal angular intervals on its outer periphery. The case has two cutouts that have different heights at the bottom at positions corresponding to the cutouts of the base. The cutouts of the base respectively abut against the cutouts of the case, and thus the first position and the second position are selected. In this embodiment, when the case is at the first position with respect to the reed switch, the switch is operated as a normally-open type push switch (FIGS. 5 and 6). Meanwhile, when the case is at the second position with respect to the reed switch, it is operated as a normally-closed type push switch (FIGS. 8 and 9). If the position of the case with respect to the reed switch can be selected from the first position or the second position, one push switch can be used either as a normally-open or as a normally-closed type push switch: there is no need to provide normally-open type and normally-closed type push switches.

The magnetic body is preferably provided at a position of the base that abuts against the first magnet (shown in FIG. 7). With the above-mentioned push switch capable of switching between normally-open and normally-closed types, by arranging the magnetic body at a position of the base that abuts against the first magnet, the base 11 can be prevented from coming off the case by using the attraction force of the first magnet embedded in the case 12. To enhance the attraction force, a magnet may be used as the magnetic body.

Effects of Invention

According to the present invention, a push switch that uses a simple-structure and high-reliability/durability reed switch can be provided.

EMBODIMENTS OF THE INVENTION

Figure 1:
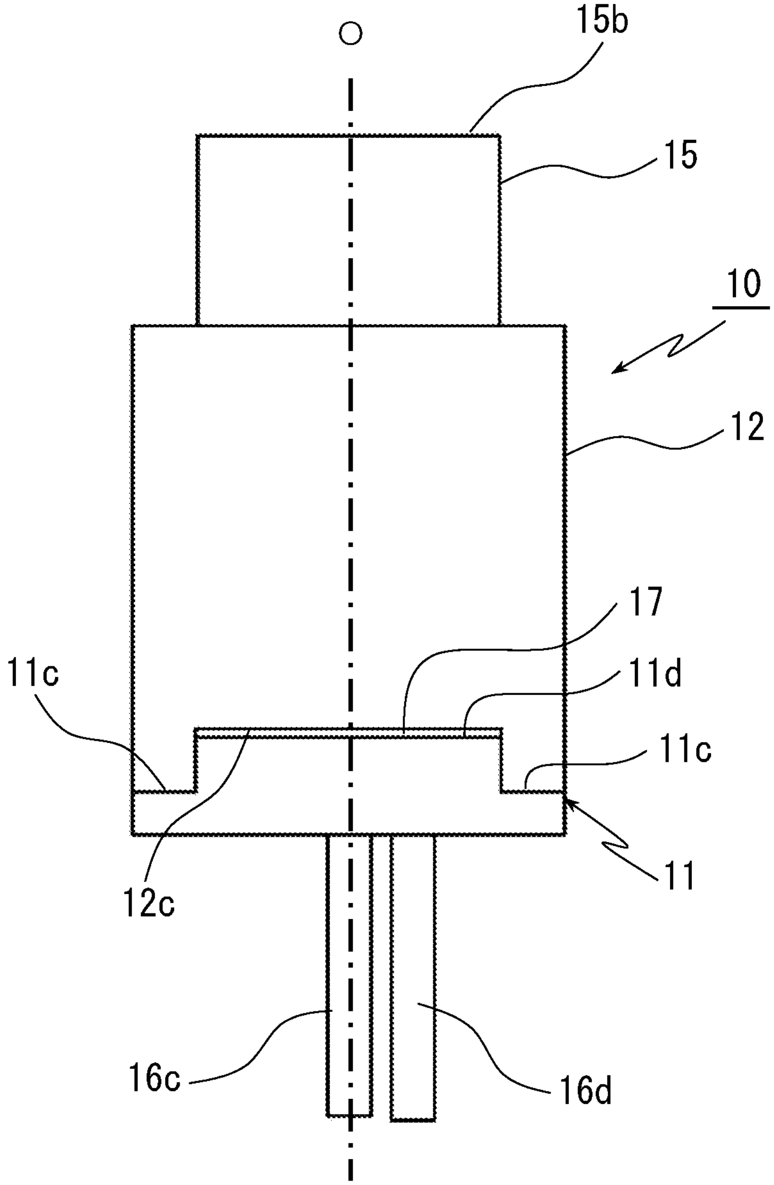
FIG. 1 is a front view of a push switch according to embodiment 1.

The embodiment of the present invention will hereinafter be described in detail by referring to drawings. The scope of the present invention is not limited to the embodiments described but can be changed as required. The same signs are assigned to the same or corresponding members, etc. in each drawing.

Embodiment 1

Embodiment 1 shown in FIGS. 1 to 9 will hereinafter be described in detail. A push switch 10 according to this embodiment comprises a base 11, a case 12 that is supported by the main body 11*a* of the base 11 and fits onto the reed switch accepting part 11*b* from outside, an annular first magnet 13 that is fastened to the main body 11*a* of the base 11 within the case 12, an annular second magnet 14 housed within the case 12, a pushing member 15 that protrudes upward from the case 12, and a reed switch 16 that is supported by the base 11 and housed in the case 12.

The base 11 is made of a nonmagnetic material such as resin and aluminum, for example, and houses the reed switch 16. The base 11 comprises, in the case shown, an approximately cylindrical main body 11*a* and a cylindrical reed switch accepting part 11*b* that extends upward from the center on the top face of the main body 11*a* along the central axis O. The reed switch accepting part 11*b* has a hollow structure that penetrates downward along the above-mentioned central axis O, houses the reed switch 16 inside, and reed wires 16*c*, 16*d* of the reed switch 16 are drawn out from the bottom to outside. The reed wires 16*c*, 16*d* are made of a nonmagnetic material such as copper and aluminum, for example. The tips of a pair of reeds 16*a*, 16*b*, which close by contacting each other due to external magnetic field to be described later, are called a contact point.

Figure 2:
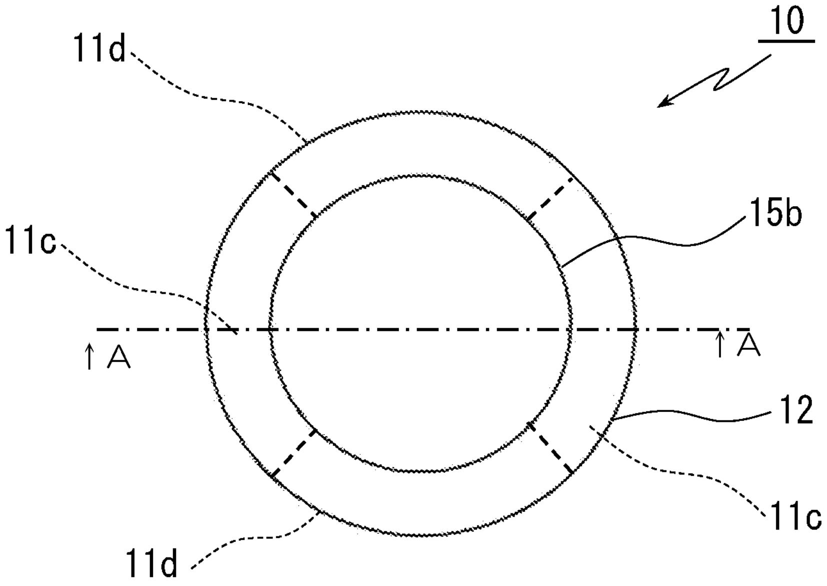
FIG. 2 is a plan view of the push switch in FIG. 1.
Figure 3:
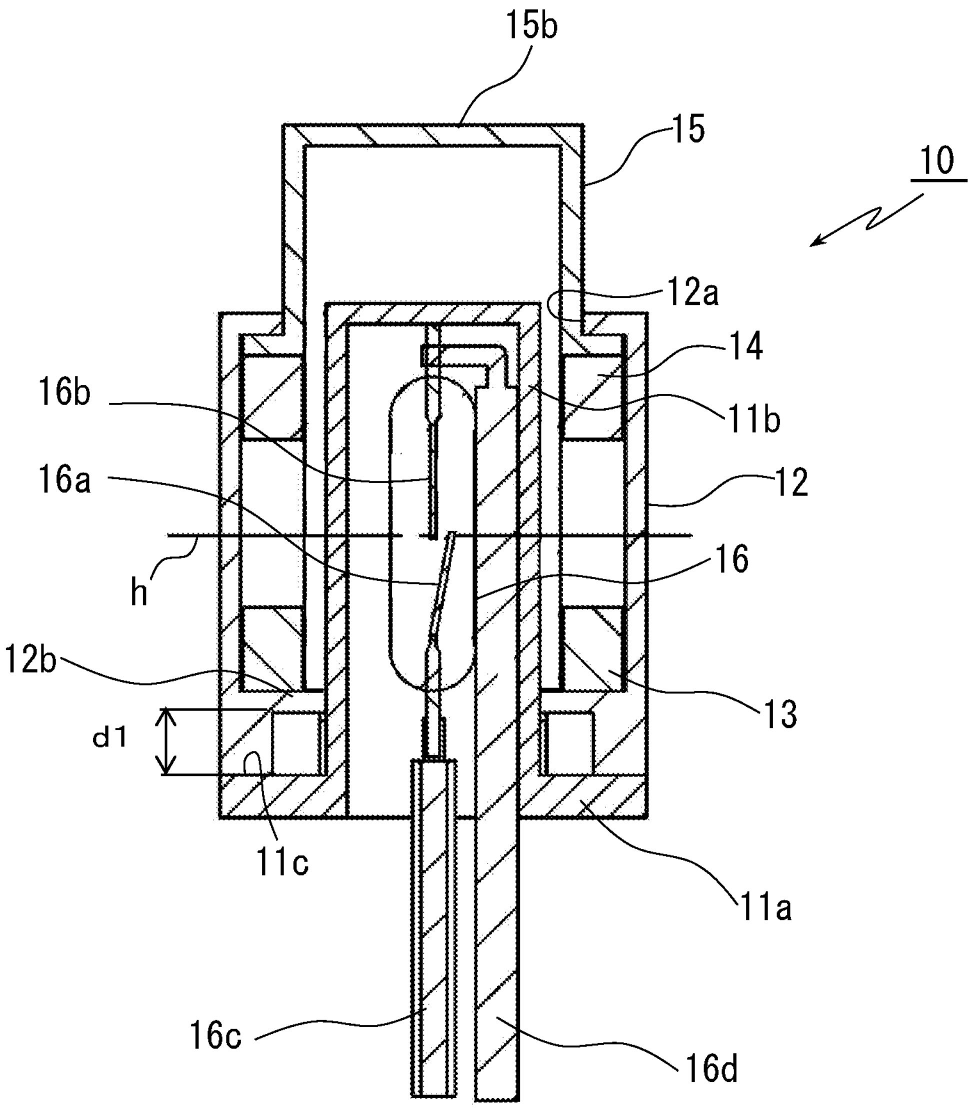
FIG. 3 is a cross-sectional view taken along line A-A of the push switch in FIG. 2.
Figure 8:
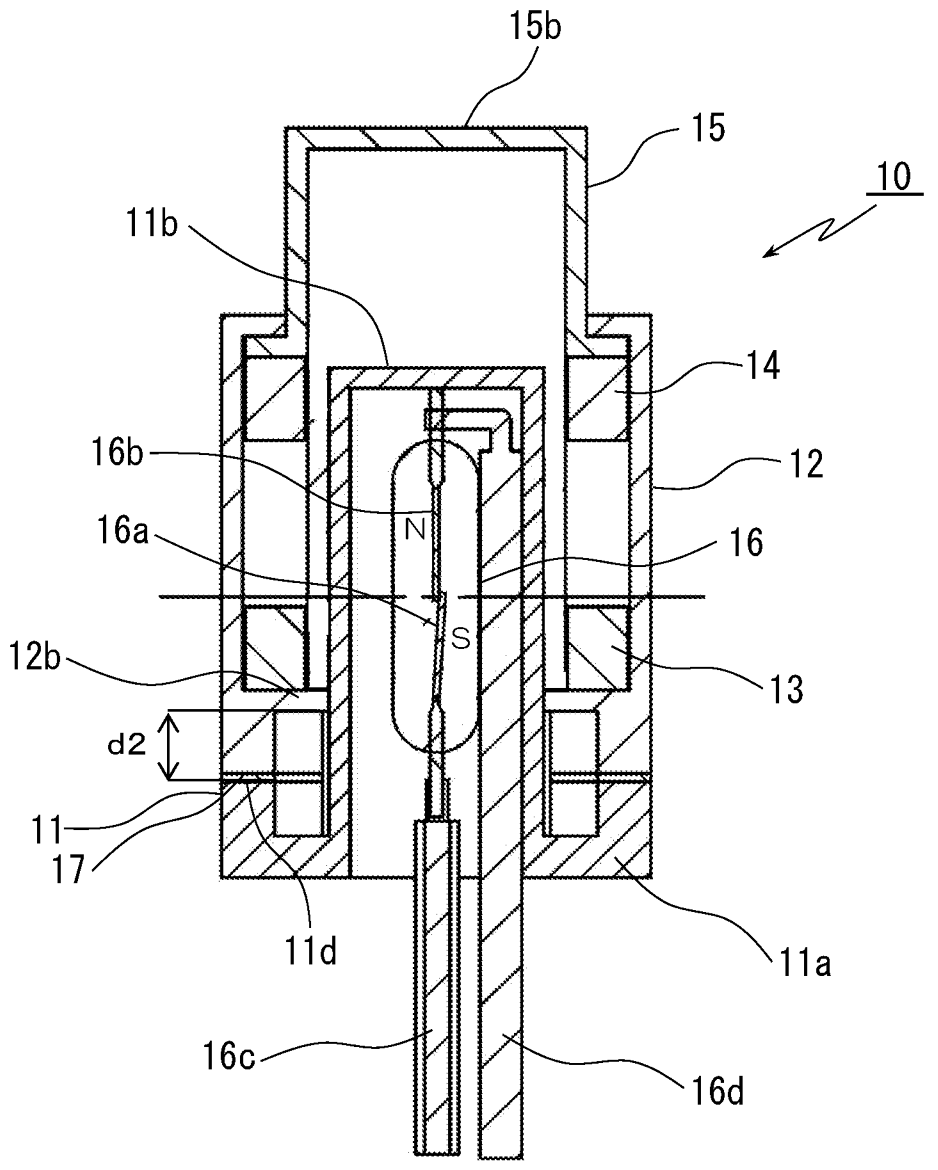
FIG. 8 is a schematic cross-sectional view of the normally-closed type push switch in FIG. 7 in a non-operating state.

The base 11 has two cutouts 11*c*, 11*d*, which are arranged alternately at equal angular intervals on the outer periphery and have different heights. The cutouts 11*c*, 11*d* are arranged alternately at intervals of about 90 degrees in the circumferential direction as shown in FIG. 2 to respectively regulate the two height positions the case 12, and as shown in FIGS. 3 and 8, have depths different from each other. The one cutout 11*c* has depth d1 as shown in FIG. 3, and the other cutout 11*d* has depth d2 as shown in FIG. 8, the cutout 11*c* being deeper than the other cutout 11*d* (d2<d1).

The case 12 is made of a nonmagnetic material such as resin and aluminum for example, formed in a hollow cylindrical shape around the central axis O, with a through hole 12*a* provided at the center of its top end. This case 12 has an annular flange 12*b* that protrudes inwards near the bottom end. The inner periphery of this flange 12*b* has a diameter slightly larger than the outer diameter of the reed switch accepting part 11*b* of the base 11 described above. The hollow case 12 is supported by the base 11, and is arranged so as to surround the reed switch 16 around the central axis. In a non-operating state where the pushing member 15 is not pressed down, the case 12 is positioned with respect to the reed switch 16 so that the contact point of the reeds 16, 16*b* of the reed switch 16 comes at the center between the first magnet 13 and the second magnet 14 in the axial direction. The central axis O of the base 11 practically coincides with the above-mentioned central axis of the reed switch 16, and each central axis of the reed switch 16, case 12, first magnet 13, and second magnet 14 coincides with the central axis O of the base 11, and the central axis O of the base 11 can thus be called the central axis of the push switch 10 of the present invention.

Furthermore, the case 12 has a cutout 12*c* at the bottom end that corresponds to the cutout 11*d* of the base 11 to select its position. In a state as shown in FIGS. 1 to 3, the cutout 12*c* of the case 12 abuts against the upward end face of the cutout 11*c* in the range of the cutout 11*c* of the base 11, regulating the height of the case 12: the case 12 is placed at a first position with respect to the base 11 and the reed switch 16.

Figure 7:
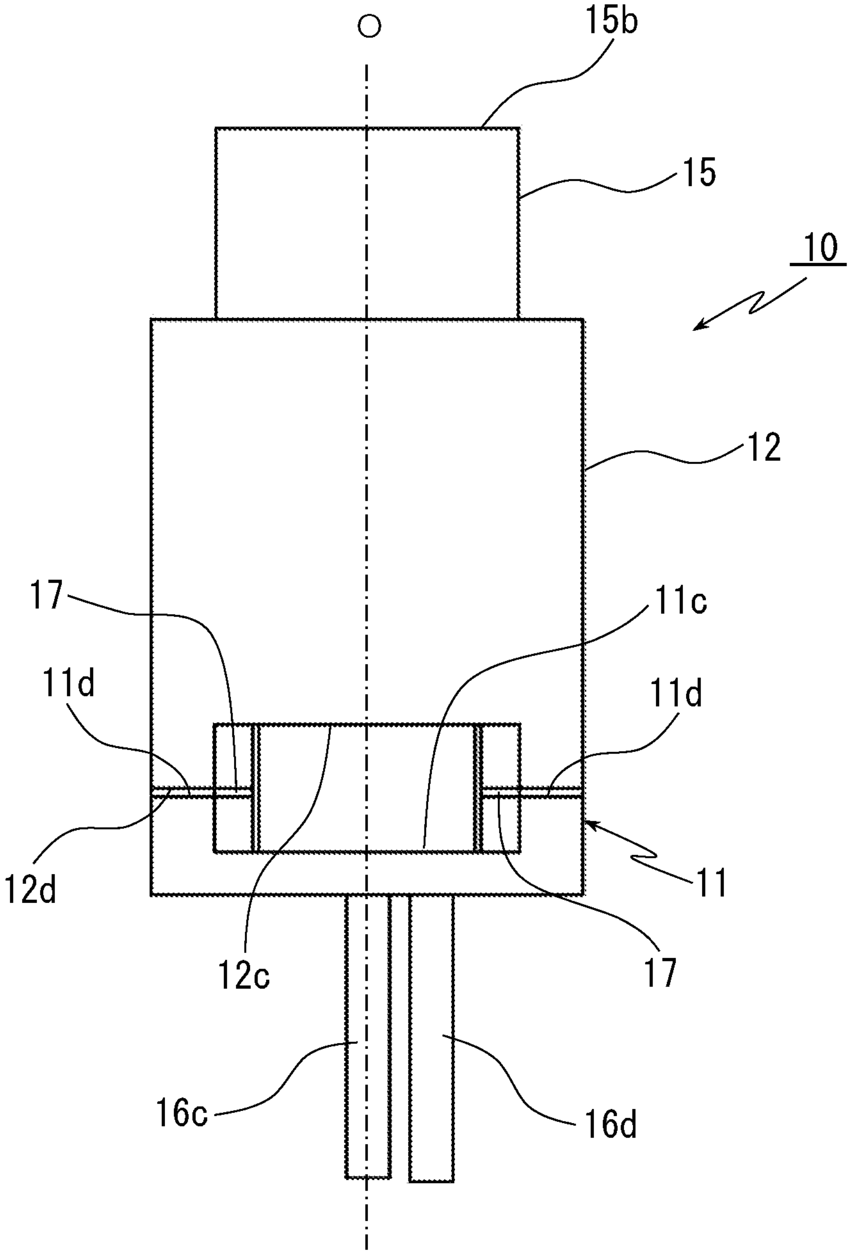
FIG. 7 is a front view of the push switch in FIG. 1 when used as a normally-closed switch.

Meanwhile, if the case 12 is fitted onto the base 11 in a state where the case 12 is rotated by 90 degrees around the central axis O from the state shown, the bottom face of the case 12 abuts against the cutout 11*d* of the base 11 as shown in FIGS. 7 and 8. The case 12 is thus placed at a second position with respect to the base 11 and the reed switch 16. At the second position, the first magnet 13 within the case 12 is placed closer to the center of the reed switch 16, and the second magnet 14 is placed away from the center of the reed switch 16 in the non-operating state (see FIG. 8).

Figure 4:
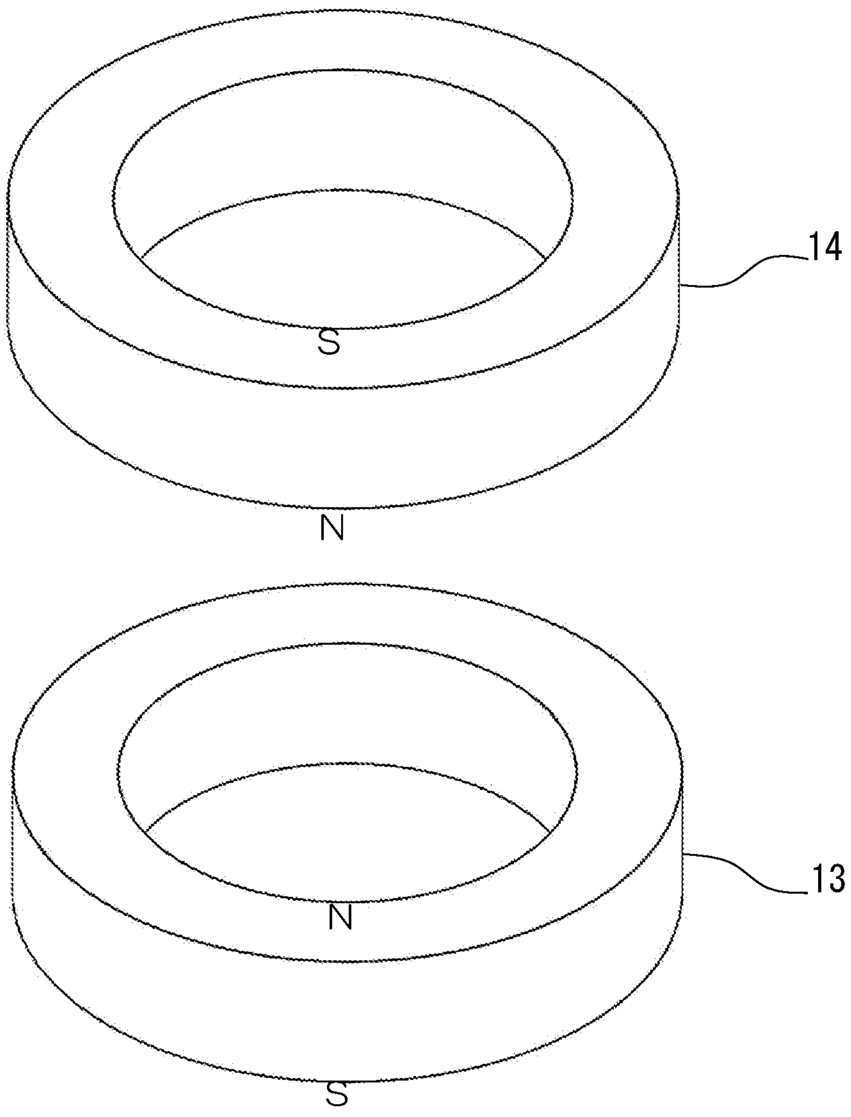
FIG. 4 is a perspective view of a magnet used for the push switch in FIG. 1.

As shown in FIG. 4, the first magnet 13, which is a permanent magnet made of ferrite, neodymium, etc., is formed in a flat annular shape and magnetized in the axial direction. The outer diameter of the first magnet 13 is made to be smaller than the inner diameter of the case 12, and the inner diameter of the first magnet 13 is selected to be larger than the outer diameter of the reed switch accepting part 11*b* of the base 11 so as to ensure smooth movement within the case 12 along the direction of the central axis O. The bottom face of the first magnet 13 is mounted to and integrated into the case 12.

The second magnet 14 is in the same configuration with the first magnet 13, and as shown in FIG. 4, is placed so that its magnetization direction becomes vertically opposite to that of the first magnet 13. The first magnet 13 is magnetized so that the top side becomes N pole and the bottom side becomes S pole, whereas the second magnet 14 is magnetized so that the bottom side becomes N pole and the top side becomes S pole. The second magnet 14 is fastened to the bottom face of the flange of the pushing member 15 and moves vertically with the pushing member 15.

The pushing member 15 is made of a nonmagnetic material such as resin and aluminum, and includes a flat and hollow cylindrical main body 15*a* and protrusion 15*b* that extends upward from the top center of the main body 15*a* along the central axis O. The main body 15*a* of the pushing member 15 has a diameter smaller than the inner diameter of the case 12, and its bottom face is fastened to the top face of the second magnet 14 using an adhesive agent, etc. The protrusion 15*b* of the pushing member 15 is exposed to outside through the through hole 12*a* at the top end of the case 12.

The first magnet 13 and the second magnet 14 are magnetized in a direction opposite to each other, which generates magnetic repulsive force between the first magnet 13 and the second magnet 14. As shown in FIG. 3, the second magnet 14 is thus maintained in the non-operating state by the above-mentioned repulsive force.

In this non-operating state, the protrusion 15*b* of the pushing member 15 is in a state sufficiently protruding from the top face of the case 12. In this non-operating state, the top face of the flange of the main body 15*a* may abut against the inner side of the top face of the case 12 to regulate the upward movement of the pushing member 15 and the second magnet 14. If the protrusion 15*b* of the pushing member 15 is pressed down, the pushing member 15 and the second magnet 14 move downward, against the above-mentioned repulsive force, to the position where the bottom face of the second magnet 14 abuts against the top face of the first magnet 13, namely the operating position.

The reed switch 16 is arranged within the reed switch accepting part 11*b* of the base 11 so that its longitudinal direction comes along the central axis O and its pair of reeds 16*a*, 16*b* are positioned close to the central axis O, and has reed wires 16*c*, 16*d* extending from the reeds 16*a*, 16*b*.

As shown in FIG. 3, when the case 12 is at the first position with respect to the base 11, the center of the reed switch 16 is at the height position h (see FIG. 3) corresponding to the center between the first magnet 13 and the second magnet 14 in the axial direction in the non-operating state. Meanwhile, as shown in FIG. 8, when the case 12 is at the second position with respect to the base 11, the first magnet 13 is placed at a position closer to the reed switch 16 in the axial direction O, and the second magnet 14 is placed at a position apart from the reed switch in the axial direction O.

Figure 5:
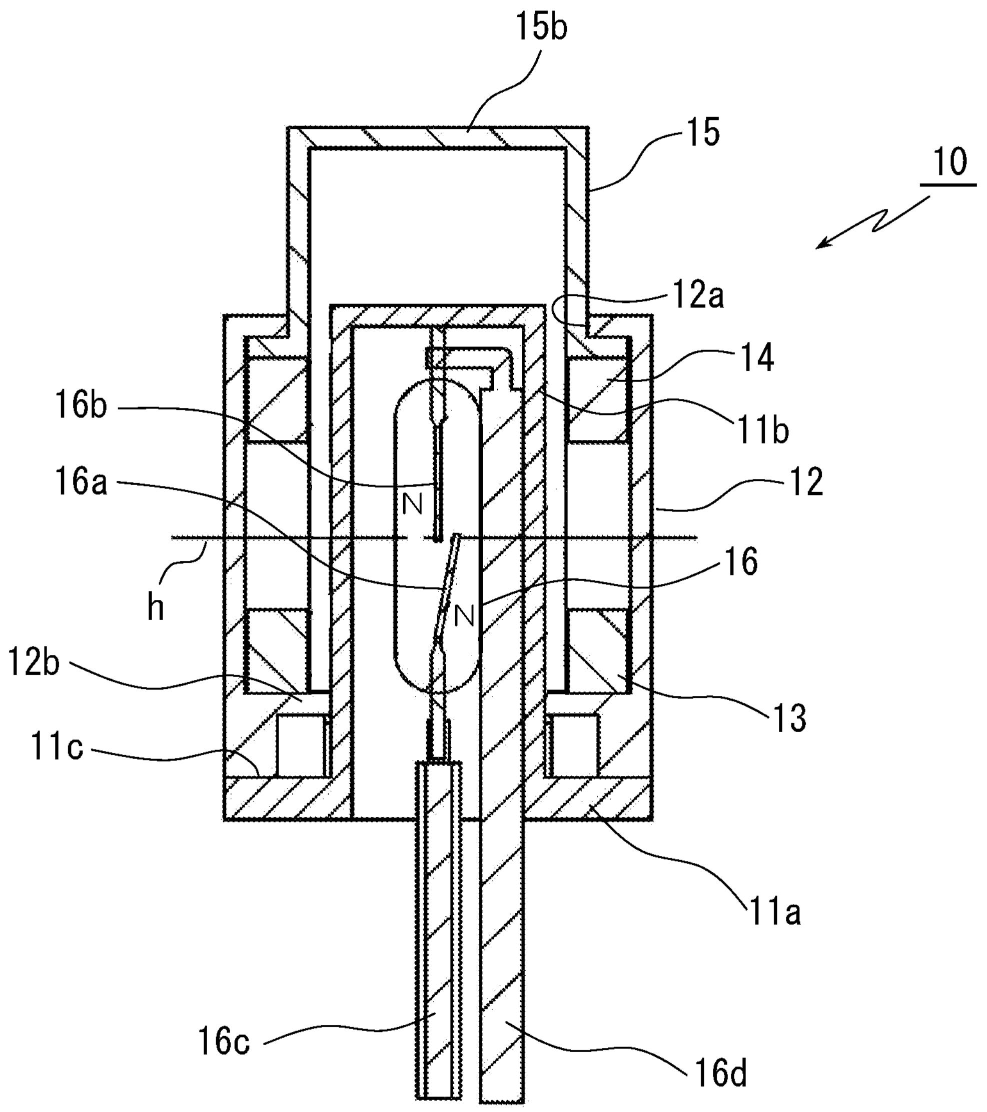
FIG. 5 is a schematic cross-sectional view of a non-operating state of a normally-open type push switch.

First, the state where the case 12 of the push switch 10 in the embodiment of the present invention is at the first position with respect to the base 11 will be described mainly by referring to FIGS. 5 and 6. As shown in FIG. 5, when the bottom periphery of the case 12 abuts against the deep end face of the cutout 11*c* of the base 11, the case 12 being at the first position with respect to the base 11, the second magnet 14 is pressed upward by the repulsive force against the first magnet 13, being in non-operating state, provided that the pushing member 15 is not pressed down. In this case, the contact point of the reed switch 16, namely the center of the switch, is at height "h," which is the central position between the first magnet 13 and the second magnet 14 in the longitudinal direction.

In this case, the lower reed 16*a* of the reed switch 16 is magnetized to become N pole by the magnetic effect of the first magnet 13, and the upper reed 16*b* is magnetized to become N pole by the magnetic effect of the second magnet 14. Since the reeds 16*a*, 16*b* of the reed switch are magnetized to become the same pole, magnetic repulsion occurs between them, thus turning off the reed switch 16. Since both reeds 16*a*, 16*b* are respectively magnetized by the first magnet 13 and the second magnet 14, and the contacts are apart from each other, the OFF state is maintained stably and insusceptible to the external impact such as magnetic fields and the vibration.

Figure 6:
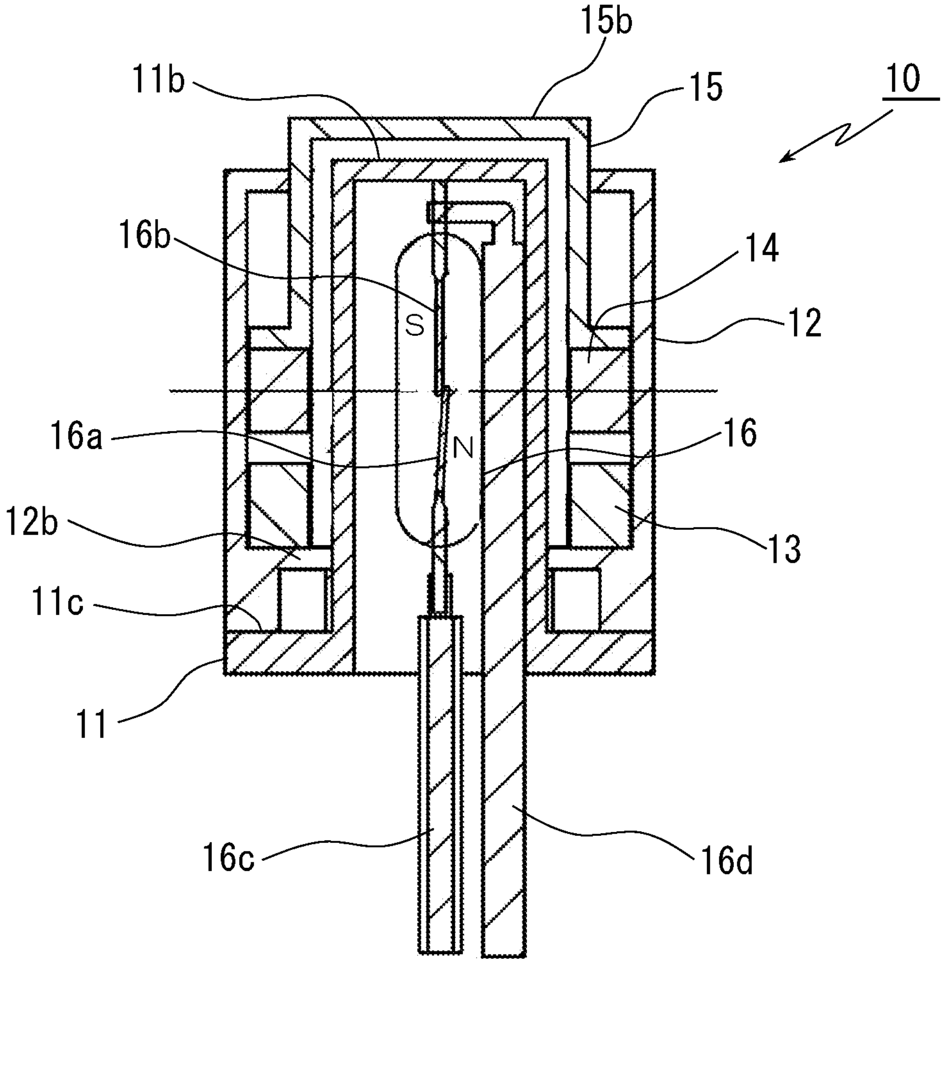
FIG. 6 is a schematic cross-sectional view of an operating state of the push switch in FIG. 5.

As shown in FIG. 6, if the protrusion 15*b* of the pushing member 15 is pressed down in the above-mentioned non-operating state, the second magnet 14 and the pushing member 15 move to an operating position close to the first magnet 13, overcoming the repulsive force exerted between the second magnet and the first magnet 13. In this operating state, the second magnet 14 is positioned close to the contact point of the reeds 16*a*, 16*b* of the reed switch 16. Consequently, the lower reed 16*a* of the reed switch 16 remains magnetized to N pole by the magnetic effect of the second magnet 14 as well as that of the first magnet 13. Meanwhile, the upper reed 16*b* changes from N pole to S pole by the magnetic effect of the second magnet 14. The reeds 16*a*, 16*b* of the reed switch are thus magnetized to opposite poles, magnetically attract and contact each other, turning on the reed switch 16. Since both reeds 16*a*, 16*b* are respectively magnetized by the first magnet 13 and the second magnet 14, the ON state is maintained stably and insusceptible to the external impact such as magnetic fields and the vibration. In the above embodiment, when the case 12 is at the first position with respect to the base 11, the reed switch 16 is set to off in the non-operating state, and the switch is turned on in the operating state while the pushing member 15 is pressed down. The switch is thus operated as a so-called normally-open type switch.

Next, the state where the case 12 is at the second position with respect to the base 11 will be described by referring to FIGS. 8 and 9. At the second position, the first magnet 13 placed on a shallow (d2) cutout 11*d* within the case 12 is at a position slightly lower than the center of the reed switch 16, and in the state where the pushing member 15 is not pressed down, the second magnet 14 is pushed upward by the repulsive force against the first magnet 13, being in a non-operating state. The first magnet 13 is at a position slightly lower than the center (contact point) of the reed switch 16, whereas the second magnet 14 is at a position far upper than the center of the reed switch 16.

As a result, the lower reed 16*a* of the reed switch 16 is magnetized to become S pole by the magnetic effect of the first magnet 13, whereas the upper reed 16*b* is magnetized to become N pole by the magnetic effect of the first magnet 13. Consequently, the reeds 16*a*, 16*b* of the reed switch are magnetized to opposite poles, thus being attracted to each other magnetically and turning on the reed switch 16. At the second position, while the pushing member 15 is in non-operating state, the both reeds 16*a*, 16*b* are respectively magnetized by the magnetic force of the first magnet 13 only, and thus the ON state is maintained stably and insusceptible to external impact such as magnetic fields and the vibration.

Figure 9:
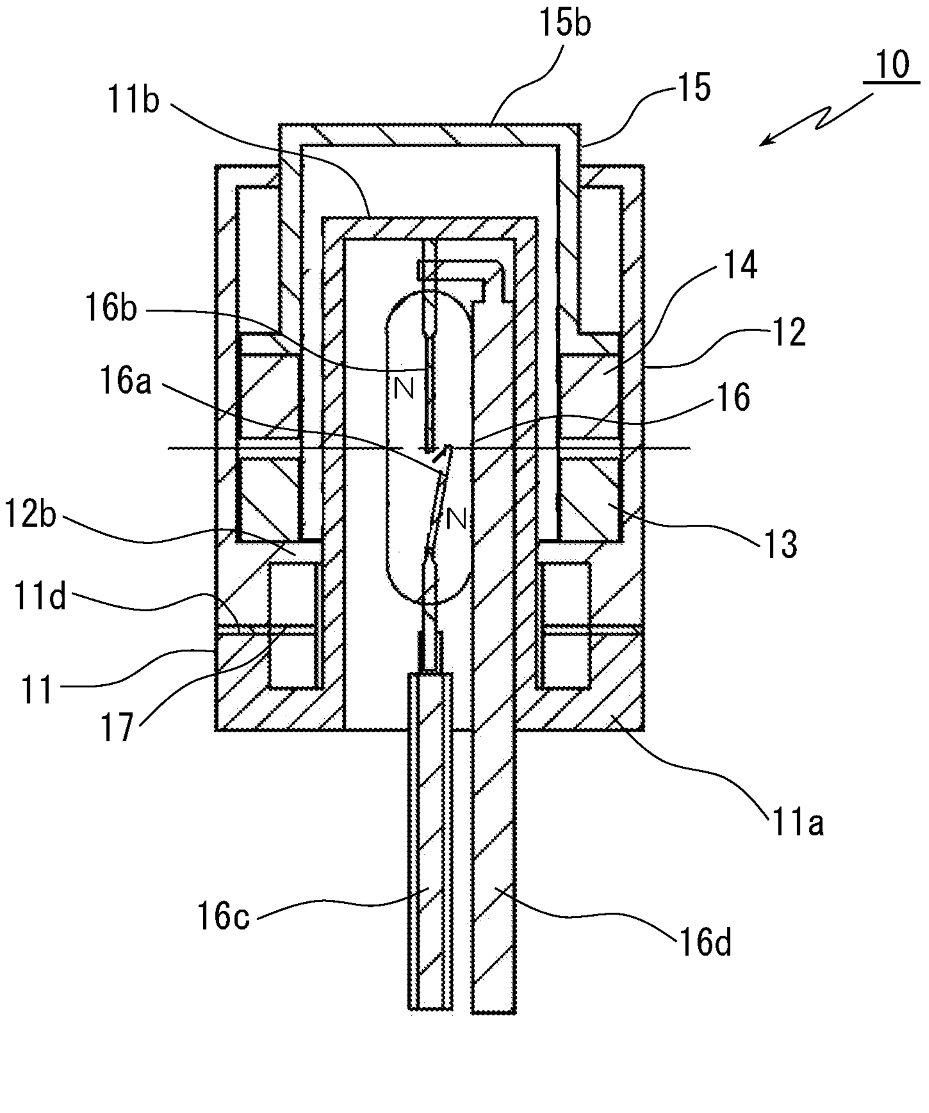
FIG. 9 is a schematic cross-sectional view of the normally-closed type push switch in FIG. 8 in an operating state.

As shown in FIG. 9, when the protrusion 15*b* of the pushing member 15 is pressed down from the non-operating position, the second magnet 14 and the pushing member 15 move to the operating position close to the first magnet 13, overcoming the repulsive force against the first magnet 13. In this operating state, both the first magnet 13 and the second magnet 14 are at positions close to the contact point of the reeds 16*a*, 16*b* of the reed switch 16. Therefore, the lower reed 16*a* turns from S pole to N pole by the magnetic effect of N pole of the second magnet 14, whereas the upper reed 16*b* remains magnetized to N pole by the magnetic effect of the first magnet 13.

Since the reeds 16*a*, 16*b* are magnetized to the same pole and thus magnetically react and come away from each other, the reed switch 16 is turned off. Since the both reeds 16*a*, 16*b* are respectively magnetized by the first magnet 13 and the second magnet 14, the OFF state is maintained stably and insusceptible to external impact such as magnetic fields and the vibration. While the case 12 is at the second position with respect to the base 11, the reed switch 16 thus comes on in the non-operating state, and comes off in the operating state, functioning as a so-called normally-closed type switch.

The above push switch 10 may have a magnetic body at a position of the base 11 abutting against the first magnet 13. Specifically, the magnetic body 17 may be mounted on the upward end face of the cutouts 11*c*, 11*d* of the base 11. In this case, the magnetic body 17 is attracted by the magnetic attraction force of the first magnet 13 to abut against the cutouts 12*c* or 12*d* of the case 12, facilitating maintaining normally-open first position and normally-closed second position by bonding between the magnetic body 17 and the first magnet 13. By mounting the magnetic body 17 on the base 11 of the push switch 10 capable of switching between normally-open and normally-closed states according to the present invention, the base 11 can be prevented from coming off the case 12 by using the attraction force of the first magnet 13 embedded in the case 12. It is also allowed to use a magnet, in addition to a magnetic sheet, as the magnetic body 17 to enhance attraction force to prevent the base 11 from coming off the case 12, ensuring switching between normally-open and normally-closed states.

Embodiment 2

Figure 10:
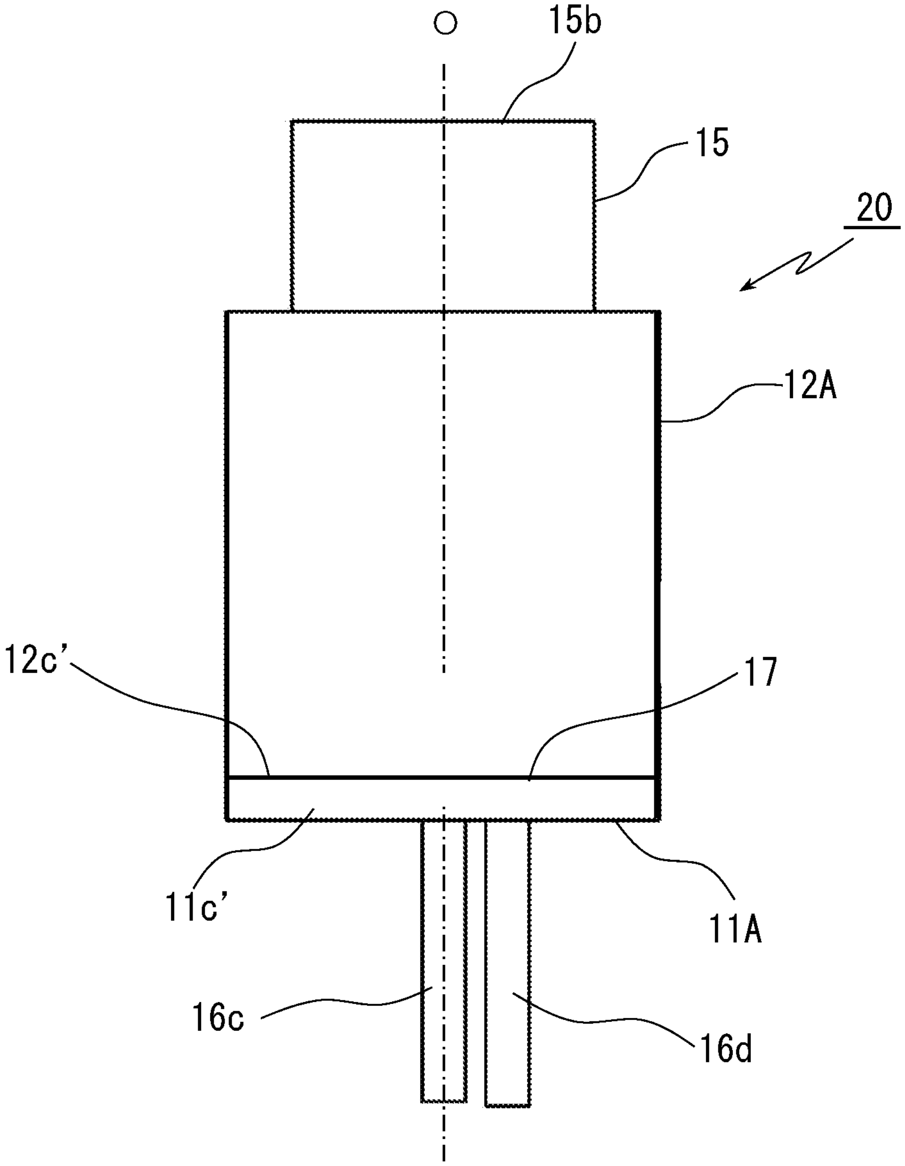
FIG. 10 is a front view of a push switch according to embodiment 2.
Figure 11:
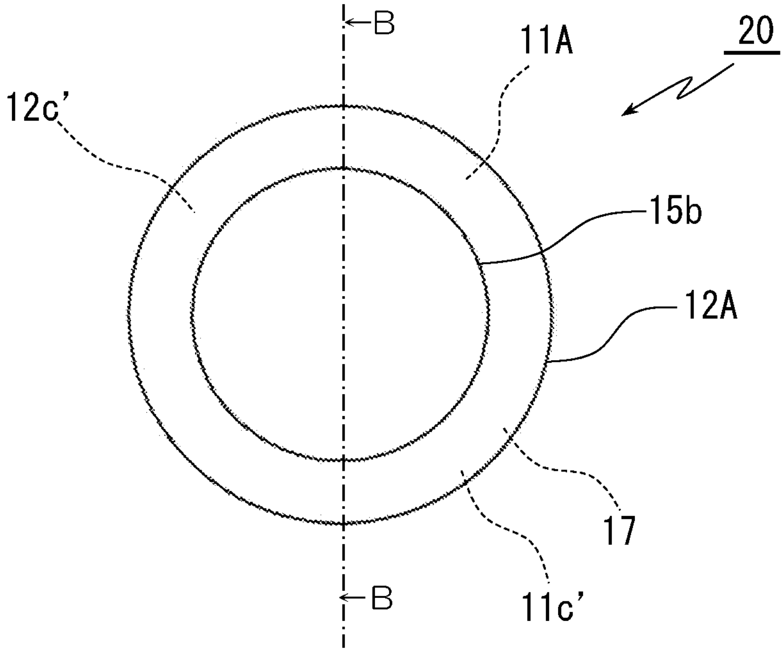
FIG. 11 is a plan view of the push switch in FIG. 10.
Figure 12:
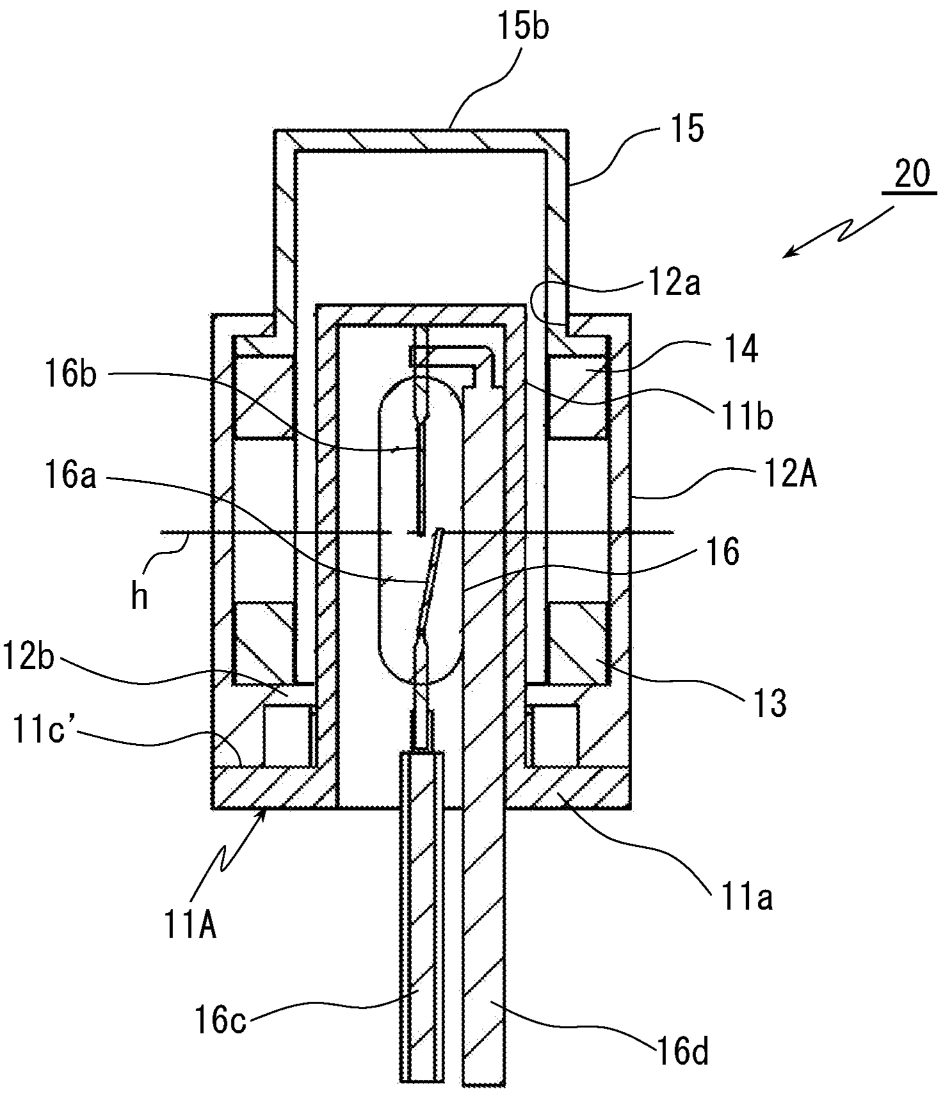
FIG. 12 is a cross-sectional view taken along line B-B of the push switch in FIG. 11.

A push switch according to embodiment 2 will hereinafter be described by referring to FIGS. 10 to 12. This push switch 20 is in the same structure as the one in embodiment 1 except for the base 11A and the case 12A. The push switch 20 is structured so that the case 12A comes at a first position with respect to the base 11A as in the case of the push switch 10. Unlike embodiment 1, however, there is no second position. Cutout 11*c*' is arranged over the entire circumference of the base 11A for the main body 11*a*. The case 12A has a cutout 12*c*' at the bottom end corresponding to the cutout 11*c*' of the base 11A. When the case 12A is fitted into the base 11A around the central axis O, the bottom face of the case 12A abuts against the cutout 11*c*' of the base 11A. The case 12A is thus positioned at the first position of the above-mentioned push switch 10 with respect to the base 11A and the reed switch 16.

With the push switch 20 according to embodiment 2, as in the case of embodiment 1, the case 12A is positioned with respect to the reed switch 16 so that the contact point of the reed switch 16 comes close to the center point between the first magnet 13 and the second magnet 14 in the non-operating state. Consequently, as shown in FIG. 12, with the push switch 12A, the reed switch 16 remains off (normally open) in the non-operating state, and in the operating state where the pushing member 15 is pressed down manually, it comes on as in the case of the push switch 10 (see FIG. 6).

With this push switch 20, the OFF state and ON state of the reed switch 16 are maintained stably and insusceptible to external impact such as magnetic fields and vibration, as in the case of the push switch 10 where the case 12 is at the first position with respect to the base 11.

Embodiment 3

Figure 13:
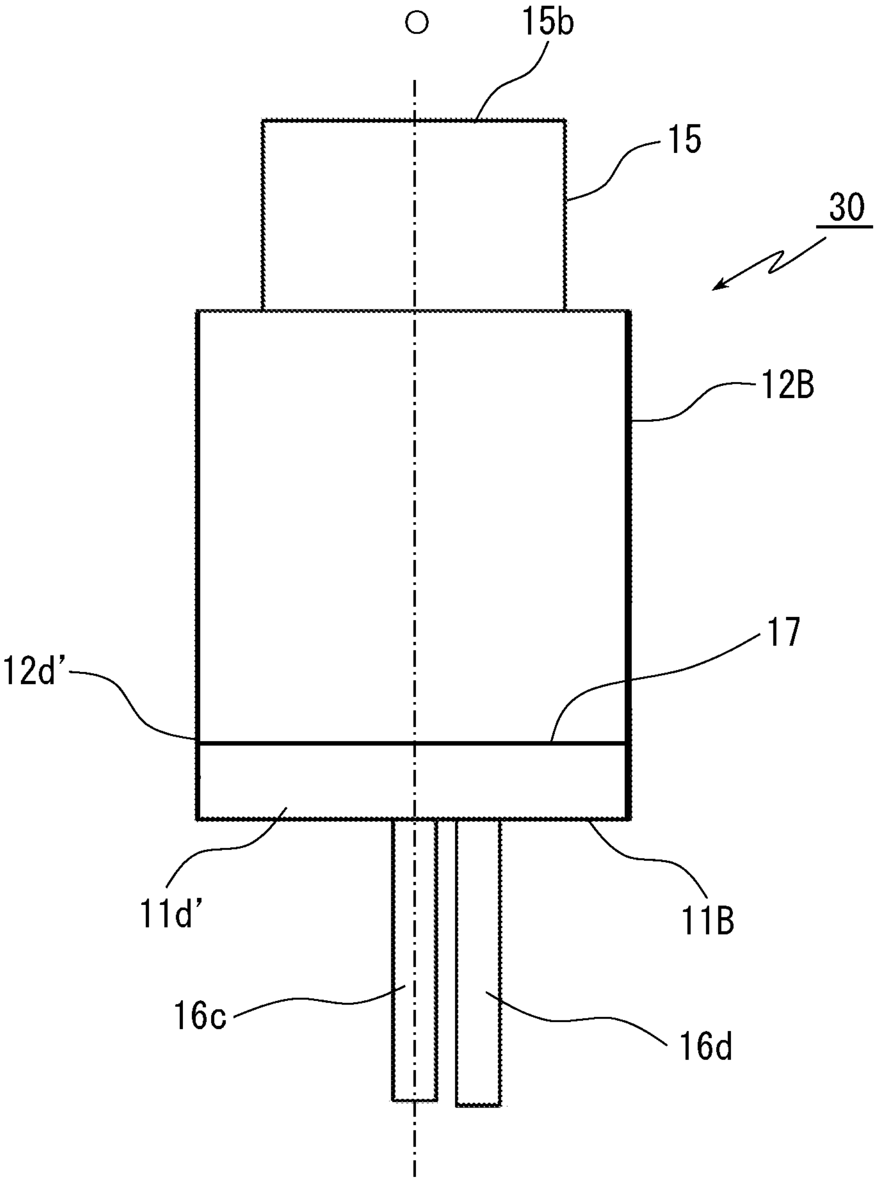
FIG. 13 is a front view of a push switch according to embodiment 3.
Figure 14:
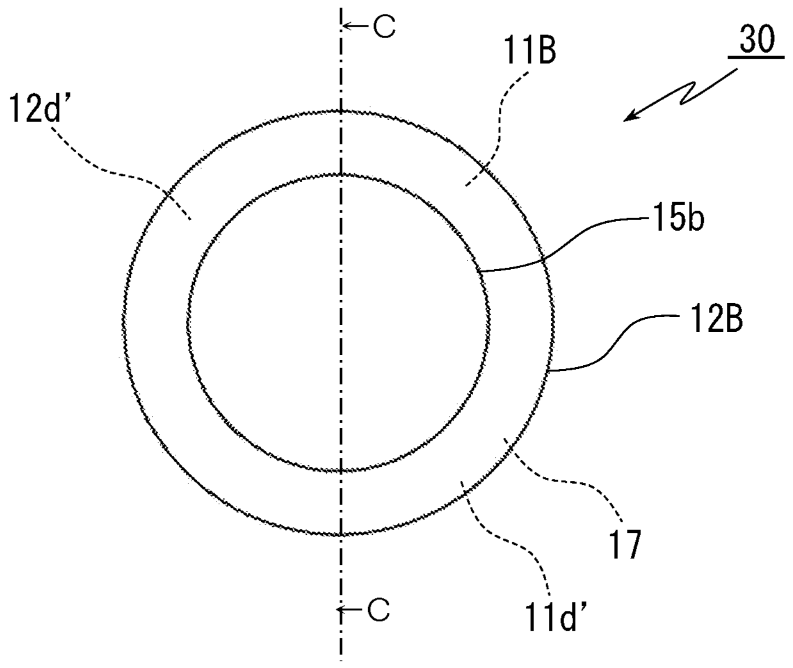
FIG. 14 is a plan view of the push switch in FIG. 13.
Figure 15:
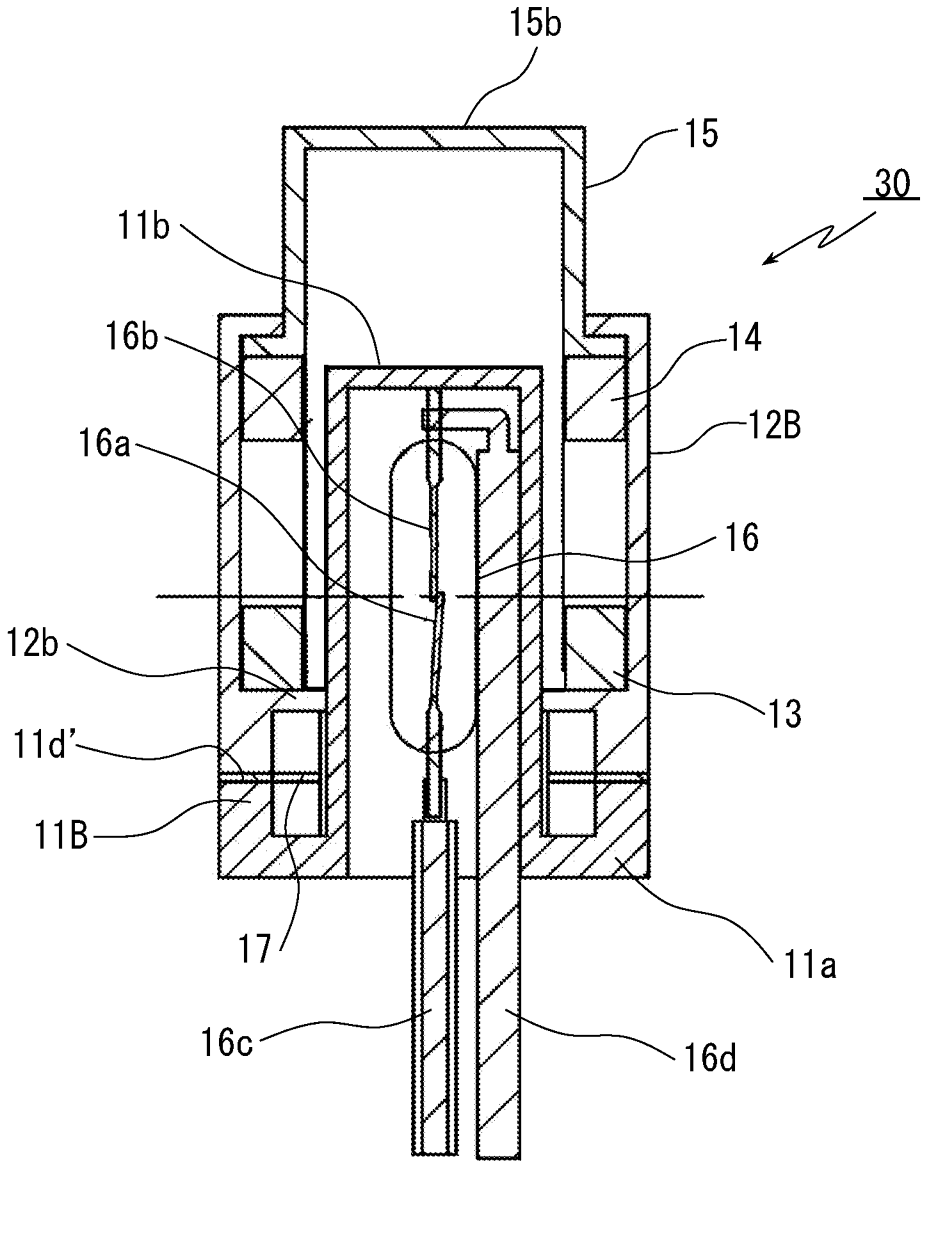
FIG. 15 is a cross-sectional view taken along line C-C of the push switch in FIG. 14.

A push switch according to embodiment 3 will hereinafter be described by referring to FIGS. 13 to 15. This push switch 30 is in the same configuration as the one in embodiment 1 except for the base 11B and the case 12B. The push switch 30 is configured so that the case 12B comes at the second position with respect to the base 11B as in the case of push switch 10. However, unlike embodiment 1, there is no first position. A cutout 11*d*' is arranged over the entire circumference of the base 11B for the main body 11*a*. The case 12B has a cutout 12*d*' at the bottom end corresponding to the cutout 11*d*' of the base 11A. When the case 12B is fitted onto the base 11B around the central axis O, the bottom face of the case 12B abuts against the cutout 11*d*' of the base 11B. The case 12B is thus placed at the second position of the above-mentioned push switch 10 with respect to the base 11B and the reed switch 16.

With the push switch 30 according to embodiment 3, as in the case of embodiment 1, the case 12B is positioned with respect to the reed switch 16 so that the contact point of the reed switch 16 comes close to the center point between the first magnet 13 and the second magnet 14 in the operating state. As in the case of push switch 10, the reed switch 16 of the push switch 30 remains on in the non-operating state (see FIG. 15), and in the non-operating state where the pushing member 15 is pressed down manually, the reed switch 16 comes off (see FIG. 9). As in the case of the push switch 10, where the case 12 is at the second position with respect to the base 11, the ON state and the OFF state of the reed switch 16 are maintained stably and insusceptible to external impact such as magnetic fields and vibration.

The present invention can be executed in various embodiments without departing from the scope of the present invention. For example, the outer periphery of the reed switch accepting part 11*b* of the base 11 can be in a shape other than cylindrical shape. Although the inner periphery of the case 12 is in cylindrical shape, other shapes are also allowed. The shape of the outer periphery of the reed switch accepting part 11*b* and the inner periphery of the case 12 may be selected arbitrarily, provided that the second magnet 14 and the pushing member 15 are vertically movable freely.

The push switches 10, 20, 30 of the present invention are applicable to various fields such as working machines and various manufacturing systems, and can be used by attaching not only in vertical direction but also in horizontal direction.

In embodiment 1 described above, the cutouts 11*c*, 11*d* on the upper side of the outer periphery of the base 11 and the cutout 12*c* on the bottom edge of the case 12 are provided alternately at angular intervals of approximately 90 degrees in the circumferential direction. However, if it is possible to regulate the first and the second positions of the case 12 with respect to the base 11 within specified angles or angle range of the case 12 around the central axis O with respect to the base 11, a locking means in an arbitrary shape may be provided. In embodiment 1, the bottom face of the second magnet 14 abuts against the top face of the first magnet 13 in the operating state, but not only this, specified intervals may be maintained.

With the push switches 20, 30 in embodiments 2 and 3 also, a magnetic body 17 may be provided on the upward end face of the cutouts 11*c*', 11*d*' of the base 11A, 11B as in the case of the push switch 10.

REFERENCE SIGN LIST

10, 20, 30: Push switch
11, 11A, 11B: Base
11*a*: Main body
11*b*: Read switch accepting part
11*c*, 11*c*', 11*d*, 11*d*': Cutout
12: Case
12*a*: Through hole
12*b*: Flange
12*c*, 12*c*', 12*d*, 12*d*': Cutout
13: First magnet
14: Second magnet
15: Pushing member
15*a*: Main body
15*b*: Protrusion
16 Reed switch
16*a*, 16*b*: Reed
16*c*, 16*d* Reed wire
17: Magnetic body

What is claimed is:

1. A push switch, comprising:
a reed switch arranged so that its central axis extends in a vertical direction;
a base for housing the reed switch;
a hollow case that is supported by the base and surrounds the reed switch around its central axis;
an annular first magnet fixedly disposed on the lower side in the case in the axial direction so as to surround the reed switch around its central axis and magnetized in the axial direction;
an annular second magnet disposed on the upper side of the case in the axial direction to be axially movable so as to surround the reed switch around its central axis and magnetized in a direction opposite to the first magnet; and
a pushing member mounted to the second magnet, a part of the pushing member protruding upward from the top edge of the case in the axial direction in a non-operating state where the first magnet is apart from the second magnet by a specified distance by repulsive force between the first magnet and the second magnet, for moving the second magnet to an operating position close to the first magnet at the time of downward operation,
wherein in the non-operating state, the case is positioned with respect to the reed switch so that the contact point of the reed switch comes between the first magnet and the second magnet in the axial direction of the case,
wherein the contact point of the reed switch can be selected between a first position where the contact point of the reed switch comes at the center between the first magnet and the second magnet in the axial direction of the case in the non-operating state, and
a second position where the contact point of the reed switch comes at the center between the first magnet and the second magnet in the axial direction of the case in the operating state, and the base has two cutouts that are arranged alternately at equal angular intervals around its outer periphery and have different heights, the case has two cutouts having different heights at positions corresponding to the cutouts of the base at the bottom, and the cutouts of the base and those of the case abut against each other to select the first position or the second position.

2. The push switch as set forth in claim 1, wherein in the non-operating state, the case is positioned with respect to the reed switch so that the contact point of the reed switch comes at the center between the first magnet and the second magnet in the axial direction of the case.

3. The push switch as set forth in claim 1, wherein in the operating state, the case is positioned with respect to the reed switch so that the contact point of the reed switch comes at the center between the first magnet and the second magnet in the axial direction of the case.

4. The push switch as set forth in claim 1, wherein a magnetic body is provided at a position where the base abuts against the first magnet.

5. The push switch as set forth in claim 1, wherein the base is provided with a magnetic body that is attracted by the first magnet embedded in the case.

6. A push switch, comprising:

a reed switch arranged so that its central axis extends in a vertical direction;

a base for housing the reed switch;

a hollow case that is supported by the base and surrounds the reed switch around its central axis;

an annular first magnet fixedly disposed on the lower side in the case in the axial direction so as to surround the reed switch around its central axis and magnetized in the axial direction;

an annular second magnet disposed on the upper side of the case in the axial direction to be axially movable so as to surround the reed switch around its central axis and magnetized in a direction opposite to the first magnet; and a pushing member mounted to the second magnet, a part of the pushing member protruding upward from the top edge of the case in the axial direction in a non-operating state where the first magnet is apart from the second magnet by a specified distance by repulsive force between the first magnet and the second magnet, for moving the second magnet to an operating position close to the first magnet at the time of downward operation, wherein the case is configured to be selectively positioned with respect to the base, wherein in the non-operating state, the case is positioned with respect to the reed switch so that the contact point of the reed switch comes between the first magnet and the second magnet in the axial direction of the case and the reed switch is ensured to be switching between normally-open state and normally-closed state thereby the case is to be selectively positioned with respect to the base.

7. The push switch as set forth in claim 6, wherein the base has two cutouts for selecting its position and the reed switch is selectively positioned in a position that functions as a normally open type switch or a normally closed type switch thereby the cutouts of the base abutting against the case.

8. The push switch as set forth in claim 6, wherein in the non-operating state, the case is positioned with respect to the reed switch so that the contact point of the reed switch comes at the center between the first magnet and the second magnet in the axial direction of the case.

9. The push switch as set forth in claim 6, wherein in the operating state, the case is positioned with respect to the reed switch so that the contact point of the reed switch comes at the center between the first magnet and the second magnet in the axial direction of the case.

10. The push switch as set forth in claim 6, wherein the contact point of the reed switch can be selected between a first position where the contact point of the reed switch comes at the center between the first magnet and the second magnet in the axial direction of the case in the non-operating state, and a second position where the contact point of the reed switch comes at the center between the first magnet and the second magnet in the axial direction of the case in the operating state.

11. The push switch as set forth in claim 6, wherein a magnetic body is provided at a position where the base abuts against the first magnet.

12. The push switch as set forth in claim 6, wherein the base is provided with a magnetic body that is attracted by the first magnet embedded in the case.

* * * * *